(12) United States Patent
Yang et al.

(10) Patent No.: US 8,991,417 B2
(45) Date of Patent: Mar. 31, 2015

(54) METHOD FOR CONTROLLING PRESSURE KEEPING FACILITY FOR COOLING AND HEATING SYSTEM PROVIDED WITH PLURALITY OF SENSORS

(75) Inventors: Jae Gu Yang, Incheon (KR); Ji Suk Yang, Seoul (KR); Sang Ki Oh, Incheon (KR)

(73) Assignee: Flowtech Co. Ltd., Incheon (KR)

(*) Notice: Subject to any disclaimer, the term of this patent is extended or adjusted under 35 U.S.C. 154(b) by 373 days.

(21) Appl. No.: 13/640,646

(22) PCT Filed: Jun. 9, 2011

(86) PCT No.: PCT/KR2011/004219
§ 371 (c)(1),
(2), (4) Date: Oct. 11, 2012

(87) PCT Pub. No.: WO2011/159061
PCT Pub. Date: Dec. 22, 2011

(65) Prior Publication Data
US 2013/0025696 A1 Jan. 31, 2013

(30) Foreign Application Priority Data
Jun. 17, 2010 (KR) .......... 10-2010-0057649

(51) Int. Cl.
*F16K 24/04* (2006.01)
*F16L 55/05* (2006.01)
*G05D 16/20* (2006.01)
*F24D 3/10* (2006.01)
(Continued)

(52) U.S. Cl.
CPC .......... *F16L 55/05* (2013.01); *F24D 10/00* (2013.01); *Y02E 20/14* (2013.01); *G05D 16/204* (2013.01); *F24D 3/1033* (2013.01); *F24D 19/1036* (2013.01)
USPC .............. 137/208; 137/209; 237/66

(58) Field of Classification Search
USPC .......... 137/208, 209, 206, 205, 487.5; 138/30; 237/66
See application file for complete search history.

(56) References Cited

U.S. PATENT DOCUMENTS

| 359,561 A | * | 3/1887 | Gates | 237/56 |
| 401,940 A | * | 4/1889 | Gates | 237/56 |

(Continued)

FOREIGN PATENT DOCUMENTS

| KR | 10-0760984 B1 | 9/2007 |
| KR | 10-0845472 B1 | 7/2008 |

OTHER PUBLICATIONS

International Search Report of PCT/KR2011/004219 dated on Dec. 14, 2011.

*Primary Examiner* — John Rivell
*Assistant Examiner* — Umashankar Venkatesan
(74) *Attorney, Agent, or Firm* — Justin H. Kim; Maxon IP LLC

(57) ABSTRACT

The present invention relates to a method of controlling pressure maintenance equipment for a cooling and heating system. More particularly, the present invention relates to a method of operating and controlling, under optimum conditions, pressure maintenance equipment with multiple sensors so as to check for irregularities in the sensors which measure the same physical parameter. In the present invention, measurement values of two or more sensors are used to detect whether an abnormality has occurred in any sensor. If a sensor is determined to be abnormal, a measurement value of the abnormal sensor is excluded when determining a reference control value. Thereby, the pressure can be precisely and reliably controlled in response to actual conditions of the system.

8 Claims, 5 Drawing Sheets

(51) Int. Cl.
  *F24D 19/10* (2006.01)
  *F24D 10/00* (2006.01)

(56) References Cited

U.S. PATENT DOCUMENTS

| | | | | |
|---|---|---|---|---|
| 516,668 A | * | 3/1894 | Wagner et al. | 137/208 |
| 1,540,744 A | * | 6/1925 | Badaracco | 261/23.1 |
| 2,085,274 A | * | 6/1937 | Rutt et al. | 222/131 |
| 2,917,113 A | * | 12/1959 | Ortman | 166/67 |
| 5,487,646 A | * | 1/1996 | Ushitora et al. | 417/4 |
| 5,957,162 A | * | 9/1999 | Arai | 138/31 |
| 2002/0153041 A1 | * | 10/2002 | Drube et al. | 137/208 |
| 2005/0269067 A1 | | 12/2005 | Cowans et al. | |
| 2006/0090545 A1 | * | 5/2006 | Mall et al. | 73/40 |

\* cited by examiner

Fig. 4

| serial number | result of comparison of measurement deviation values with preset deviation value | checking sensors | reference control value |
|---|---|---|---|
| 1 | $A, B, C \leqq 1$ | all normal | mean of measurement values of P1 and P2 |
| 2 | $A, B > 1$, $C \leqq 1$ | P2 abnormal | measurement value of P1 |
| 3 | $B, C > 1$, $A \leqq 1$ | P3 abnormal | measurement value of P2 |
| 4 | $C, A > 1$, $B \leqq 1$ | P1 abnormal | mean of measurement values of P1 and P2 |
| 5 | $A, B, C > 1$ | two or more abnormal | alarm, system interruption or median value control |

$A = |P1 - P2|, \ B = |P2 - P3|, \ C = |P3 - P1|$

METHOD FOR CONTROLLING PRESSURE KEEPING FACILITY FOR COOLING AND HEATING SYSTEM PROVIDED WITH PLURALITY OF SENSORS

TECHNICAL FIELD

The present invention relates, in general, to methods of controlling pressure maintenance equipment for cooling and heating systems and, more particularly, to a method of operating and controlling, under optimum conditions, pressure maintenance equipment with multiple sensors in such a way that irregularities in the sensors which measure the same physical parameter are checked.

BACKGROUND ART

Recently, as one example of a cooling and heating system, a district cooling and heating system using incineration plants or combined cycle cogeneration is being invigorated. The district cooling and heating system is an economical system in which a concentrated heat source plant (e.g. a cogeneration plant) supplies heat for heating, supplying hot-water or cooling to residential, commercial, government etc. buildings that request it in a city or predetermined district by means of a piping network, without using individual heat generation equipment (an oil or gas boiler, etc.). In such a district cooling and heating system, the supply of heat is embodied by the following method. First, a district cooling and heating medium which is made in the heat source plant is supplied to a heat exchanger of demanding buildings over an adiabatic pipe network. The heat medium supplied to the heat exchanger transfers heat to an internal circulation heat medium of the demanding buildings by a heat exchanger for the demanding buildings and then returns it to the heat source plant. Circulation water of the demanding buildings that has received heat in the heat exchanger chamber is supplied to each household or each floor of the buildings. The heat medium that is used in the majority of cases for district cooling and heating is water. Because of the characteristics of district cooling and heating, water is typically heated to a medium-high temperature (100 degrees or more) before circulating it through the pipe network.

In such a cooling and heating system, pipe water in a circulation piping system repetitively expands and contracts depending on variations in the temperature. If the pipe water rapidly expands, the pipe pressure sharply increases, creating such risks as the bursting of a pipe. To avoid such a risk from being caused by the expansion of water in the pipe, typical cooling and heating systems are provided with an expansion tank which serves as pressure maintenance equipment for maintaining the pressure in the pipe constant in such a way that when pipe water expands, the expansion tank temporarily receives the expansion water to reduce the pipe pressure, and when pipe water contracts, the expansion water that has been received in it returns to the pipe.

FIG. 1 is a view illustrating the construction of a conventional cooling and heating system. In this conventional cooling and heating system, a heat medium (pipe water) heated by a heat source plant 1 is supplied to or returned from a cooling and heating apparatus (a load; 10a) or an adjacent heat exchanger of a demanding building by a circulation piping system 10. The cooling and heating system includes an expansion tank 130 which branches off from the circulation piping system 10 to temporarily receive the expanded heat medium and return the heat medium to the circulation piping system 10 when the heat medium contracts; an expansion pipe 20 which branches off from the circulation piping system 10 and is connected to the expansion tank 130; and a nitrogen supply unit 200 which is connected to a predetermined portion of the expansion tank 130 to supply nitrogen gas into the expansion tank 130.

The expansion tank 130 comprises a diaphragm or non-diaphragm type hollow closed pressure tank. The expansion tank 130 is provided with a tank pressure sensor PT2 and a tank-water-level sensor LT which sense the pressure and the level of expansion water in the tank. Furthermore, the expansion tank 130 is provided with a nitrogen gas supply valve S1 which controls the supply of nitrogen gas from the nitrogen supply unit 200 into the expansion tank 130, and a nitrogen gas exhaust valve S2 which controls the exhaust of nitrogen gas from the expansion tank 130.

The nitrogen supply unit 200 supplies nitrogen gas into the expansion tank 130 and includes a compressor (not shown) which compresses air to a predetermined pressure and supplies it, and a nitrogen generator (not shown) which extracts only nitrogen from the air supplied from the compressor and supplies it into the expansion tank 130.

A method of operating the cooling and heating system will be explained below. In the initial stage, the expansion tank 130 is supplied with nitrogen gas from the nitrogen supply unit 200 so that it is filled with nitrogen gas under the initial pressure of the expansion tank 130. The water level of the expansion tank 130 is maintained at the lowest water level (LWL). If the heat medium expands, the heat medium is drawn from the circulation piping system 10 into the expansion tank 130 through the expansion pipe 20. The water level of the expansion tank 130 increases to the highest water level (HWL). At this time, the tank pressure sensor PT2 senses the internal pressure of the expansion tank that has been increased by the supply of expansion water. Then, the control unit 400 opens the nitrogen gas exhaust valve S2 so that nitrogen gas is exhausted from the expansion tank until the internal pressure of the expansion tank falls within an optimal operation pressure range.

If the expansion water returns to the circulation piping system 10 again, or if, as time passes, nitrogen gas dissolves in the heat medium, and even though it does so only by a small amount, the internal pressure of the expansion tank 130 may drop below the optimal operation pressure range. When this occurs it is sensed by the tank pressure sensor PT2 so that the control unit 400 opens the nitrogen gas supply valve S1. Thereby, nitrogen gas is supplied from the nitrogen supply unit 200 into the expansion tank 130 such that the internal pressure of the expansion tank 130 is maintained within the optimal operation pressure range.

As such, depending on physical parameters (pressure, water level) that are sensed by the pipe pressure sensor PT1, the tank pressure sensor PT2 and the tank-water-level sensor LT, the conventional expansion control apparatus supplies nitrogen gas into the expansion tank 130 or discharges it therefrom, thus controlling the internal pressure of the expansion tank 130 so that the pipe pressure of the circulation piping system 10 can be maintained constant.

The expansion tank 130 must be designed so that its capacity is such that it can receive the amount of expansion water that is formed when pipe water of the circulation piping system 10 expands. However, because the capacity of the expansion tank 130 that can be designed is limited, if the circulation piping system 10 is of high capacity, it is difficult for only the single expansion tank 130 to encompass the entirety of the expansion water. Hence, multiple expansion tanks are typically used.

In the system provided with multiple expansion tanks, an additional expansion pipe is provided branching off from the existing expansion pipe 20, and an additional expansion tank is connected to the additional expansion pipe in such a way that the additional expansion tank is parallel to the existing expansion tank 130. A tank pressure sensor and a tank-water-level sensor are provided on each expansion tank.

In the pressure maintenance equipment provided with the multiple expansion tanks, the supply of gas into each expansion tank or the exhaust of gas therefrom may be individually controlled based on values measured by the corresponding tank pressure sensor and tank-water-level sensor. Alternatively, the mean of values measured by the sensors may be used to simultaneously control the supply of gas into the expansion tanks or the exhaust of gas therefrom.

However, in the case where each expansion tank is individually controlled, if an error between the sensors is comparatively large, the expansion tanks may be differently controlled despite being in the same system. For instance, despite the fact that nitrogen gas must be exhausted from the expansion tank when pipe water expands, if an error of the sensor of any expansion tank is significant or the sensor itself malfunctions, nitrogen gas may be supplied to the expansion tank in opposition to the state of the other expansion tank or the entire system.

On the other hand, in the case where only the mean of measurement values of the sensors is simply used to simultaneously control the expansion tanks, if any one of the multiple sensors is not within a permissible range or a temporary abnormality has occurred in any sensor, a difference between the actual pipe pressure of the system and a reference control value makes it difficult to appropriately control the system in response to the conditions of the system. For example, supposing that the optimal pressure of the expansion tanks is 9.0 $kg/m^2 \cdot G$, if the pressure of an expansion tank provided with a normal sensor is measured to be 10.0 $kg/m^2 \cdot G$ while the pressure of the other expansion tank is measured to be 0 $kg/m^2 \cdot G$ because of an abnormality in the sensor, the reference control value becomes 5 $kg/m^2 \cdot G$ as a result of a simple calculation of the mean, so nitrogen gas is supplied to the expansion tanks despite the fact that nitrogen gas should be exhausted from the expansion tanks until the internal pressure of the tanks reaches 9.0 $kg/m^2 \cdot G$.

As such, if the control of pressure of the system cannot respond to the actual conditions of the system because of an error and malfunction of any sensor, not only may the pressure maintenance equipment itself malfunction, but it may also have a great influence on the entirety of the cooling and heating system. That is, if the internal pressure of the expansion tanks excessively decreases, flushing occurs in the pipe, causing a big accident or defective heating. If the internal pressure of the expansion tanks excessively increases, excessive pressure is applied to the piping equipment, thus damaging the pipes or other equipment.

DISCLOSURE

Technical Problem

Accordingly, the present invention has been made keeping in mind the above problems occurring in the conventional method of controlling the pressure maintenance equipment provided with multiple sensors, and an object of the present invention is to provide a control method which can control the pressure of pressure maintenance equipment in response to conditions of a system in such a way as to detect whether an abnormality has occurred in any sensor and exclude a value measured by an abnormal sensor when determining a reference control value.

Technical Solution

In order to accomplish the above object, in an aspect, the present invention provides a method of controlling pressure maintenance equipment for a cooling and heating system, the pressure maintenance equipment including: a first expansion tank and a second expansion tank provided branching off from a circulation piping system and connected parallel to the circulation piping system, the first expansion tank and second expansion tank being connected to each other by an equalizing pipe; a first pressure sensor and a second pressure sensor respectively and independently provided on the first expansion tank and the second expansion tank, each of the first and second pressure sensors measuring an internal pressure of the corresponding expansion tank; a third pressure sensor sensing a pipe pressure of the circulation piping system; a nitrogen supply unit supplying nitrogen gas into the expansion tanks; nitrogen gas supply valves provided to supply nitrogen gas from the nitrogen supply unit into the corresponding expansion tanks; and nitrogen gas exhaust valves provided to exhaust nitrogen gas from the corresponding expansion tanks, the method including: measuring the internal pressure of the first expansion tank using the first pressure sensor; measuring the internal pressure of the second expansion tank using the second pressure sensor; measuring the pipe pressure of the circulation piping system using the third pressure sensor; calculating absolute values of differences among measurement values of the internal pressures of the first and second expansions tanks and a measurement value of the pipe pressure of the circulation piping system, measured by the corresponding pressure sensors, and calculating measurement deviation values between the respective pressure sensors; comparing the calculated measurement deviation values between the respective pressure sensors with a preset deviation value; determining whether an abnormality has occurred in each of the pressure sensors based on the result of the comparison between the measurement deviation values and the preset deviation value; excluding the measurement value of a pressure sensor that is determined to be abnormal and the measurement value of the third pressure sensor, and outputting the measurement value of the remaining pressure sensor or a mean of the measurement values of the remaining pressure sensors as a reference control value for the internal pressures of the expansion tanks; and comparing the output reference control value with a preset target reference value of the expansion tanks, and determining whether pipe water has expanded or contracted, and supplying nitrogen gas to the expansion tanks or exhausting nitrogen gas from the expansion tanks depending on a result of the determining whether the pipe water has expanded or contracted.

The preset deviation value may be defined as a maximum value of a permissible deviation of each of the pressure sensors when all of the pressure sensors are normal.

When all of the measurement deviation values between the respective pressures sensors are equal to or less than the preset deviation value, all of the pressure sensors may be determined to be normal, and a mean of measurement values of the first pressure sensor and the second pressure sensor may be output as the reference control value. When both a measurement deviation value between the first pressure sensor and the second pressure sensor and a measurement deviation value between the second pressure sensor and the third pressure sensor are greater than the preset deviation value, and a measurement deviation value between the third pressure sensor and the first pressure sensor is equal to or less than the preset deviation value, the second pressure sensor may be determined to be abnormal, and the measurement value of the first pressure sensor may be output as the reference control value. When a measurement deviation value between the first pressure sensor and the second pressure sensor is equal to or less than the preset deviation value, and both a measurement deviation value between the second pressure sensor and the third pressure sensor and a measurement deviation value between the third pressure sensor and the first pressure sensor are greater than the preset deviation value, the third pressure sensor may be determined to be abnormal, and a mean of the measurement values of the first pressure sensor and the second pressure sensor may be output as the reference control value. When both a measurement deviation value between the first pressure sensor and the second pressure sensor and a measurement deviation value between the third pressure sensor and the first pressure sensor are greater than the preset deviation value, and a measurement deviation value between the second pressure sensor and the third pressure sensor is equal to or less than the preset deviation value, the first pressure sensor may be determined to be abnormal, and the measurement value of the second pressure sensor may be output as the reference control value.

When all of measurement deviation values between the respective pressure sensors are greater than the preset deviation value, two or more pressure sensors may be determined to be abnormal.

In another aspect, the present invention provides a method of controlling pressure maintenance equipment for a cooling and heating system, the pressure maintenance equipment including: a first expansion tank, a second expansion tank and a third expansion tank provided branching off from a circulation piping system and connected parallel to the circulation piping system, the first, second and third expansion tanks being connected to each other by equalizing pipes; a first pressure sensor, a second pressure sensor and a third pressure sensor respectively and independently provided on the first, second and third expansion tanks, each of the first, second and third pressure sensors measuring an internal pressure of the corresponding expansion tank; a nitrogen supply unit supplying nitrogen gas to the expansion tanks; nitrogen gas supply valves provided to supply nitrogen gas from the nitrogen supply unit to the corresponding expansion tanks; and nitrogen gas exhaust valves provided to exhaust nitrogen gas from the corresponding expansion tanks, the method including: measuring the internal pressures of the expansion tanks using the corresponding pressure sensors; calculating absolute values of differences between respective measurement values of the expansion tanks that are measured by the pressure sensors, and calculating measurement deviation values between the respective pressure sensors; comparing the calculated measurement deviation values between the respective pressure sensors with a preset deviation value; determining whether an abnormality has occurred in each of the pressure sensors based on a result of the comparison between the measurement deviation values and the preset deviation value; excluding the measurement value of a pressure sensor that is determined to be abnormal, and outputting a mean of the measurement values of the remaining pressure sensors as a reference control value for the internal pressures of the expansion tanks; and comparing the output reference control value with a preset target reference value of the expansion tanks, and determining whether pipe water has expanded or contracted, and supplying nitrogen gas to the expansion tanks or exhausting nitrogen gas from the expansion tanks depending on a result of the determining whether the pipe water has expanded or contracted.

The preset deviation value may be defined as a maximum value of a permissible deviation of each of the pressure sensors when all of the pressure sensors are normal.

When all of the measurement deviation values between the respective pressure sensors are equal to or less than the preset deviation value, all of the pressure sensors may be determined to be normal, and a mean of measurement values of the first pressure sensor, the second pressure sensor and the third pressure sensor may be output as the reference control value. When both a measurement deviation value between the first pressure sensor and the second pressure sensor and a measurement deviation value between the second pressure sensor and the third pressure sensor are greater than the preset deviation value, and a measurement deviation value between the third pressure sensor and the first pressure sensor is equal to or less than the preset deviation value, the second pressure sensor may be determined to be abnormal, and a mean of the measurement values of the first pressure sensor and the third pressure sensor may be output as the reference control value. When a measurement deviation value between the first pressure sensor and the second pressure sensor is equal to or less than the preset deviation value, and both a measurement deviation value between the second pressure sensor and the third pressure sensor and a measurement deviation value between the third pressure sensor and the first pressure sensor are greater than the preset deviation value, the third pressure sensor may be determined to be abnormal, and a mean of the measurement values of the first pressure sensor and the second pressure sensor may be output as the reference control value. When both a measurement deviation value between the first pressure sensor and the second pressure sensor and a measurement deviation value between the third pressure sensor and the first pressure sensor are greater than the preset deviation value, and a measurement deviation value between the second pressure sensor and the third pressure sensor is equal to or less than the preset deviation value, the first pressure sensor may be determined to be abnormal, and a mean of the measurement values of the second pressure sensor and the third pressure sensor may be output as the reference control value.

When all measurement deviation values between the respective pressure sensors are greater than the preset deviation value, two or more pressure sensors may be determined to be abnormal.

Advantageous Effects

In the present invention, measurement values of two or more sensors are used to detect whether an abnormality has occurred in any sensor. If a sensor is determined to be abnormal, the measurement value of the abnormal sensor is excluded when determining the reference control value. Thereby, the pressure can be precisely and reliably controlled in response to the actual conditions of the system.

DESCRIPTION OF DRAWINGS

FIG. 4 is a table showing in detail the method of controlling the pressure maintenance equipment according to the first embodiment of the present invention.

DESCRIPTION OF THE REFERENCE NUMERALS IN THE DRAWINGS

1: heat source plant
10: circulation piping system
130: expansion tank
150: equalizing pipe
400: control unit

BEST MODE

Hereinafter, preferred embodiments of a method of controlling pressure maintenance equipment with multiple sensors for a cooling and heating system according to the present invention will be described in detail with reference to the attached drawings.

Figure 1:
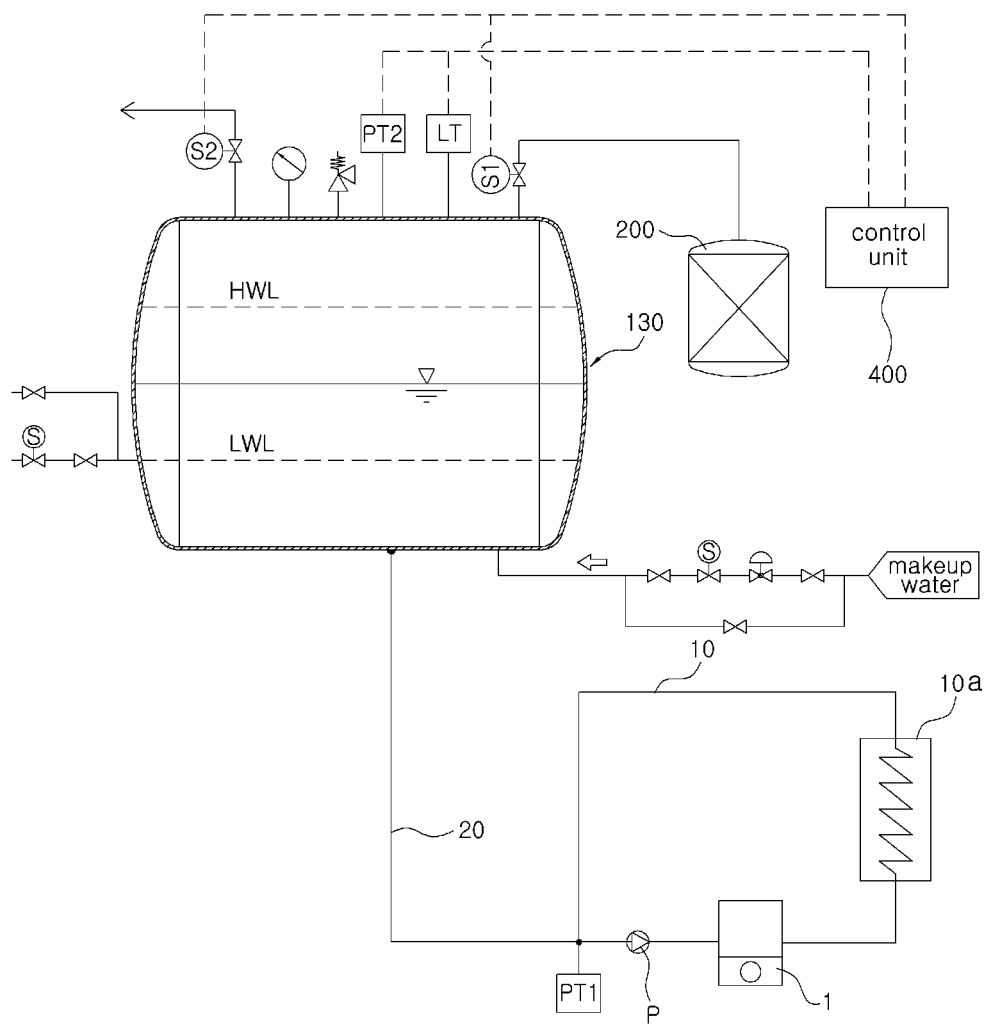
FIG. 1 is a view showing the construction of conventional pressure maintenance equipment of a cooling and heating system.
Figure 2:
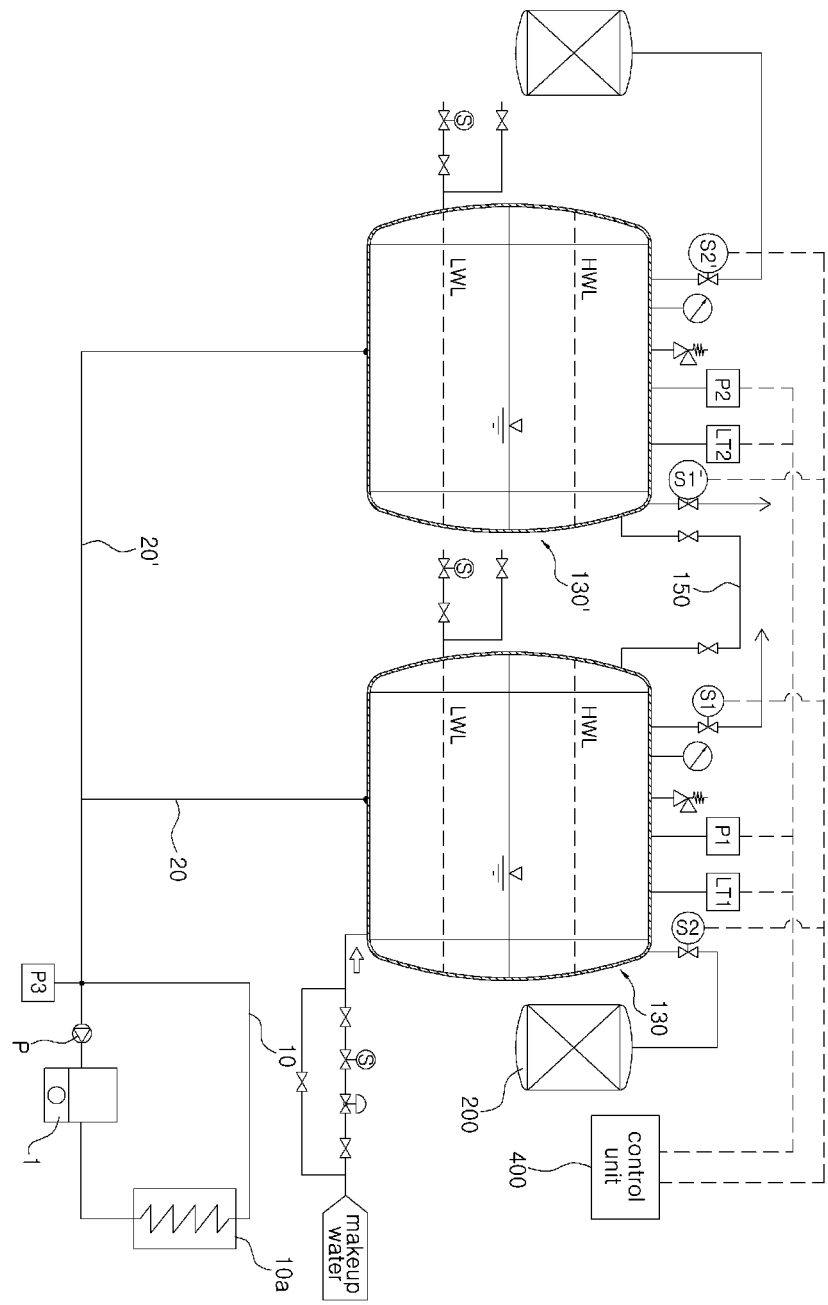
FIG. 2 is a view illustrating the construction of pressure maintenance equipment of a cooling and heating system, according to a first embodiment of the present invention.
Figure 3:
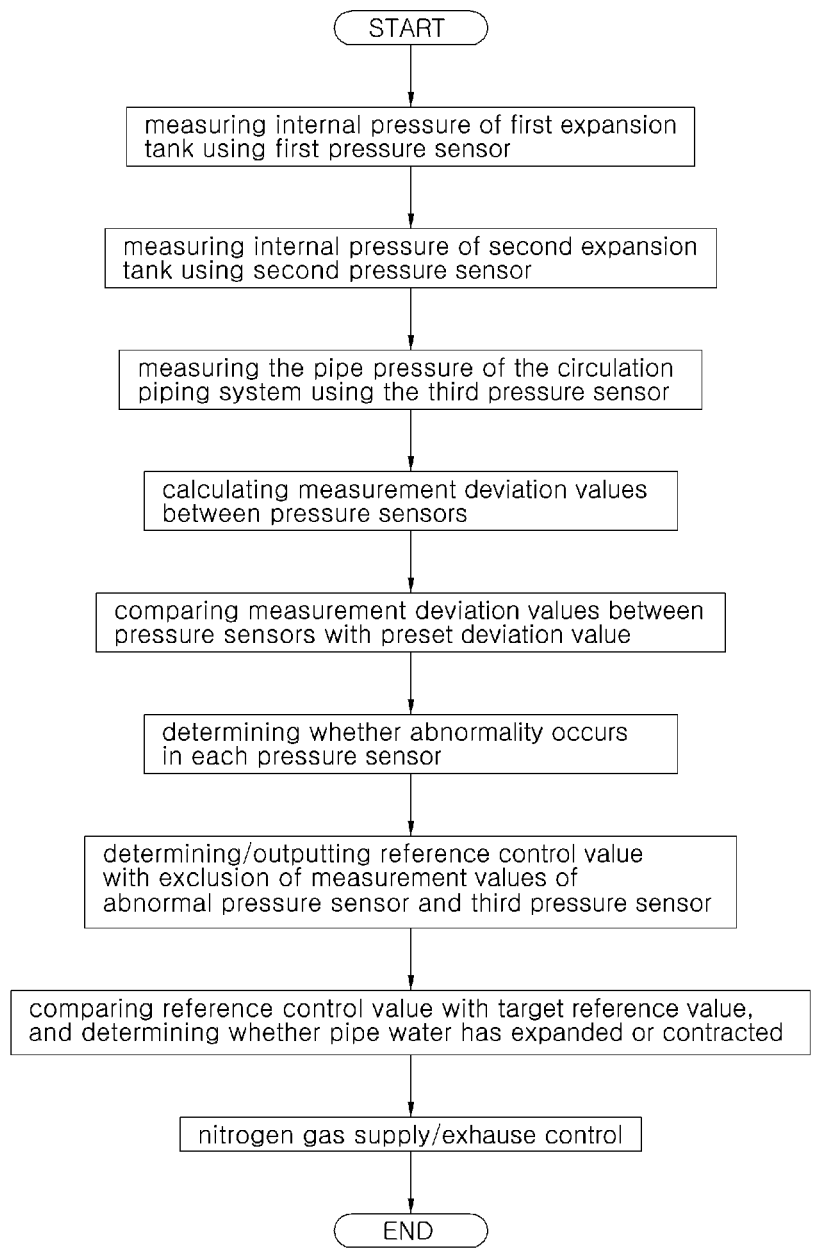
FIG. 3 is a flowchart of a method of controlling the pressure maintenance equipment according to the first embodiment of the present invention.

FIG. 2 illustrates an example of the pressure maintenance equipment with multiple sensors according to a first embodiment of the present invention, wherein two different expansion tanks each of which includes an independent sensor are provided. FIG. 3 is a flowchart of a method of controlling the pressure maintenance equipment. FIG. 4 illustrates in detail the method of controlling the pressure maintenance equipment as a function of conditions of the sensors.

As shown in FIG. 2, in the present invention, a first expansion tank 130 and a second expansion tank 130 are connected in parallel to a circulation piping system 10 and connected to each other by an equalizing pipe 150 to maintain the internal pressures of the tanks at an equal level. A tank pressure sensor and a tank-water-level sensor are provided separately on each expansion tank. A pipe pressure sensor is provided in the circulation piping system 10. Hereinafter, as shown in FIG. 2, the tank pressure sensor of the first expansion tank 130 refers to a first pressure sensor P1, the tank pressure sensor of the second expansion tank 130 refers to a second pressure sensor P2, and the pipe pressure sensor of the circulation piping system 10 refers to a third pressure sensor P3.

The target optimum pressure (hereinafter, referred to as 'the target reference value') of both the first expansion tank 130 and the second expansion tank 130 is 9.0 kg/m$^2$·G. Because the first expansion tank 130 and the second expansion tank 130 are connected to each other by the equalizing pipe 150, the internal pressures of the tanks are theoretically maintained at the same level. The pipe pressure of the circulation piping system 10 is theoretically the same as the pressure of the first expansion tank 130 and the second expansion tank 130, but, actually, it is expressed about 0.2 kg/m$^2$·G higher because of a differential head.

Physical parameters (in the invention, pressures) that are fundamental to controlling the pressure maintenance equipment are measured by the first pressure sensor P1 and the second pressure sensor P2. If an error of any one of the two sensors is not within a permissible range or one sensor itself malfunctions (hereinafter, both these two cases will be expressed as 'abnormality' of the sensor), it is very difficult to determine which sensor is abnormal.

In response, to determine which one of the two sensors is abnormal, the present invention uses the pipe pressure sensor, that is, the third pressure sensor P3, which has a pressure similar to that of each expansion tank, as a reference sensor, compares the third pressure sensor with the first pressure sensor and the second pressure sensor, calculates a value closest to the actual pressure of the system, and controls the internal pressure of the expansion tanks. Hereinafter, a method of determining whether an abnormality has occurred in any sensor and a method of controlling the pressure maintenance equipment will be described in more detail with reference to FIGS. 3 and 4.

As shown in FIG. 3, in order to control the pressure maintenance equipment provided with the multiple sensors, a control unit 400 receives internal pressure measurement values of the first expansion tank 130 and the second expansion tank 130 from the first pressure sensor P1 and the second pressure sensor P2 and a pipe pressure measurement value of the circulation piping system 10 from the third pressure sensor P3 and then stores the values. Thereafter, the control unit 400 calculates absolute values (hereinafter, referred to as 'measurement deviation values') of differences between the stored measurement values of the sensors and compares the calculated measurement deviation values with a preset deviation value.

Here, the preset deviation value is defined to be the maximum of permissible deviation of each of the pressure sensors when all of the pressure sensors are normal. This preset deviation value can be empirically set depending on a target reference value of the expansion tank. For instance, if the target reference value of the expansion tank is 9.0 kg/m$^2$·G, it is preferable that the preset deviation value be 1 kg/m$^2$·G, which is 10% of the maximum. If the target reference value is 100 kg/m$^2$·G, it is preferable for the preset deviation value to be 5 kg/m$^2$·G or more.

Depending on the result of the comparison between each measurement deviation value and the preset deviation value, the control unit 400 determines whether an abnormality has occurred in each pressure sensor. If a pressure sensor has been determined to be abnormal, the control unit 400 excludes the measurement values of the abnormal pressure sensor and the third pressure sensor P3 and then determines and outputs a reference control value (a reference value used to determine whether pipe water has expanded or contracted and used to control supply or exhaust of nitrogen gas). The control unit 400 subsequently compares the reference control value with the target reference value and determines whether pipe water has expanded or contracted. Depending on the result of this determination, the control unit 400 opens nitrogen gas supply valves S1 and S1' or nitrogen gas exhaust valve S2 and S2', which are provided on the expansion tanks, so that nitrogen gas is supplied thereinto or exhausted therefrom, thereby controlling the internal pressures of the expansion tanks at the same time.

FIG. 4 briefly illustrates the results of determining whether an abnormality has occurred in each pressure sensor and a method of determining reference control values as a function of the result of the comparison between the measurement deviation values and the preset deviation value. In FIG. 4, the target reference value of the expansion tank is set at 9.0 kg/m$^2$·G, and the preset deviation value at 1 kg/m$^2$·G, and the units have been omitted for the sake of convenience.

As shown in FIG. 4, the results of comparison of the measurement deviation values of the respective pressure sensors to the preset deviation value can be classified into five cases. Also, here, the character A denotes a measurement deviation value |P1−P2| between the first pressure sensor P1 and the second pressure sensor P2, B denotes a measurement deviation value |P2−P3| between the second pressure sensor P2 and the third pressure sensor P3, and C denotes a measurement deviation value |P3−P1| between the third pressure sensor P3 and the first pressure sensor P1.

First is the case where all of the measurement deviation values A, B and C are equal to or less than the preset deviation value that is 1. Because this means that each deviation value between the pressure sensors falls within the permissible deviation range of the normal conditions, the control unit 400 determines that all of the pressure sensors are normal and controls the pressures of the expansion tanks at the same time based on the mean of the measurement values of the first pressure sensor P1 and the second pressure sensor P2 (Here, the measurement value of the third pressure sensor P3 is greater than that of the first pressure sensor P1 or the second pressure sensor P2 because of a differential head, so that is excluded). In other words, if the mean of the measurement values of the first pressure sensor P1 and the second pressure sensor P2 is greater than the target reference value of the expansion tanks, the nitrogen gas exhaust valves S2 and S2' open so that nitrogen gas is exhausted from the expansion tanks, thus adjusting the internal pressures of the expansion tanks to the target reference value. If the mean of the measurement values of the first pressure sensor P1 and the second pressure sensor P2 is less than the target reference value of the expansion tanks, the nitrogen gas supply valves S1 and S1' open so that nitrogen gas is supplied into the expansion tanks, thus adjusting the internal pressures of the expansion tanks to the target reference value.

For example, if the measurement value of the first pressure sensor P1 is 8.7, and the measurement value of the second pressure sensor P2 is 8.6, and the measurement value of the third pressure sensor P3 is 8.9, $A=|P1-P2|=|8.7-8.6|=0.1, A \leq 1,$ $B=|P2-P3|=|8.6-8.9|=0.3, B \leq 1,$ and $C=|P3-P1|=|8.9-8.7|=0.2, C \leq 1.$ As such, because all of A, B and C are equal to or less than the preset deviation value of 1, all of the three pressure sensors are determined to be normal. Therefore, the control unit excludes the measurement value of the third pressure sensor P3 and outputs, as the reference control value, 8.65, which is the mean of 8.7 (the measurement value of the first pressure sensor P1) and 8.6 (the measurement value of the second pressure sensor P2). Because this value is less than 9.0, which is the target reference value of the expansion tanks, nitrogen gas is supplied to the expansion tanks.

Second, in the case where the measurement deviation values A and B are greater than 1, the preset deviation value, and only C is equal to or less than 1, the control unit 400 determines that the second pressure sensor P2 is abnormal, and thus excludes the measurement value of the second pressure sensor P2 and the measurement value of the third pressure sensor P3 and uses only the measurement value of the first pressure sensor P1 to control the pressures of the expansion tanks. In other words, if the measurement value of the first pressure sensor P1 is greater than the target reference value of the expansion tanks, the nitrogen gas exhaust valve S2 and S2' open so that nitrogen gas is exhausted from the expansion tanks, thus adjusting the internal pressures of the expansion tanks to the target reference value. On the other hand, if the measurement value of the first pressure sensor P1 is less than the target reference value of the expansion tanks, the nitrogen gas supply valves S1 and S1' open so that nitrogen gas is supplied to the expansion tanks, thus adjusting the internal pressures of the expansion tanks to the target reference value.

For example, if the measurement value of the first pressure sensor P1 is 8.7, and the measurement value of the second pressure sensor P2 is 10.0, and the measurement value of the third pressure sensor P3 is 8.9, $A=|P1-P2|=|8.7-10.0|=1.3, A>1,$ $B=|P2-P3|=|10.0-8.9|=1.1, B>1,$ and $C=|P3-P1|=|8.9-8.7|=0.2, C \leq 1.$ As such, because A and B are greater than 1, the preset deviation value, and only C is equal to or less than 1, the second pressure sensor P2 is determined to be abnormal. The control unit excludes the measurement value of the second pressure sensor P2 and the measurement value of the third pressure sensor P3 and outputs as the reference control value 8.7, which is the measurement value of the first pressure sensor P1. Because this value is less than the target reference value of the expansion tanks, nitrogen gas is supplied to the expansion tanks.

Third, in the case where the measurement deviation value A is equal to or less than 1, the preset deviation value, while B and C are greater than 1, the control unit 400 determines that the third pressure sensor P3 is abnormal, and thus excludes the measurement value of the third pressure sensor P3 and uses the mean of the measurement values of the first pressure sensor P1 and the second pressure sensor P2 to control the internal pressures of the expansion tanks. That is, if the mean of the measurement value of the first pressure sensor P1 and the measurement value of the second pressure sensor P2 is greater than the target reference value of the expansion tanks, the nitrogen gas exhaust valves S2 and S2' open so that nitrogen gas is exhausted from the expansion tanks, thus adjusting the internal pressures of the expansion tanks to the target reference value. On the other hand, if the mean of the measurement value of the first pressure sensor P1 and the measurement value of the second pressure sensor P2 is less than the target reference value of the expansion tanks, the nitrogen gas supply valve S1 and S1' open so that nitrogen gas is supplied to the expansion tanks, thus adjusting the internal pressures of the expansion tanks to the target reference value.

For example, if the measurement value of the first pressure sensor P1 is 8.9, and the measurement value of the second pressure sensor P2 is 8.7, and the measurement value of the third pressure sensor P3 is 7.5, $A=|P1-P2|=|8.9-8.6|=0.1, A \leq 1,$ $B=|P2-P3|=|8.6-8.9|=0.3, B \leq 1,$ and $C=|P3-P1|=|8.9-8.7|=0.2, C \leq 1.$ As such, because B and C are greater than 1, the preset deviation value, while A is equal to or less than 1, the control unit determines that the third pressure sensor P3 is abnormal. Thus, the control unit excludes the measurement value of the third pressure sensor P3 and outputs as the reference control value 8.8, which is the mean of 8.9 (the measurement value of the first pressure sensor P1) and 8.7 (the measurement value of the second pressure sensor P2). Because this value is less than 9.0, which is the target reference value of the expansion tanks, nitrogen gas is supplied to the expansion tanks.

Fourth, in the case where the measurement deviation values C and A are greater than 1, the preset deviation value, and only B is equal to or less than 1, the control unit 400 determines that the first pressure sensor P1 is abnormal, and thus excludes the measurement value of the first pressure sensor P1 and the measurement value of the third pressure sensor P3 and uses only the measurement values of the second pressure sensor P2 to control the internal pressures of the expansion tanks. That is, if the measurement value of the second pressure sensor P2 is greater than the target reference value of the expansion tanks, the nitrogen gas exhaust valves S2 and S2' open so that nitrogen gas is exhausted from the expansion tanks, thus adjusting the internal pressures of the expansion tanks to the target reference value. If the measurement value of the second pressure sensor P2 is less than the target reference value of the expansion tanks, the nitrogen gas supply valves S1 and S1' open so that nitrogen gas is supplied to the expansion tanks, thus adjusting the internal pressures of the expansion tanks to the target reference value.

For example, if the measurement value of the first pressure sensor P1 is 10.8, and the measurement value of the second pressure sensor P2 is 9.5, and the measurement value of the third pressure sensor P3 is 9.3, $$A=|P1-P2|=|10.8-9.5|=1.3, A>1,$$

$$B=|P2-P3|=|9.5-9.7|=0.2, B\leq 1, \text{ and}$$

$$C=|P3-P1|=|9.7-10.8|=1.1, C>1.$$

As such, because A and C are greater than 1, the preset deviation value, and B is equal to or less than 1, the first pressure sensor P1 is determined to be abnormal. The control unit excludes the measurement value of the first pressure sensor P1 and the measurement value of the third pressure sensor P3 and outputs as the reference control value 9.5, which is the measurement value of the second pressure sensor P2. Because this value is greater than the target reference value of the expansion tanks, nitrogen gas is exhausted from the expansion tanks.

Finally, in the case where A, B and C are all greater than 1, for example, if the measurement values of the pressure sensors are respectively 6, 8 and 10, two or more pressure sensors are determined to be abnormal and the control unit generates an alarm. In this case, it is preferable that the system be checked after suspending the operation thereof, or the mean or median of the three pressure sensors may be temporarily used.

Figure 5:
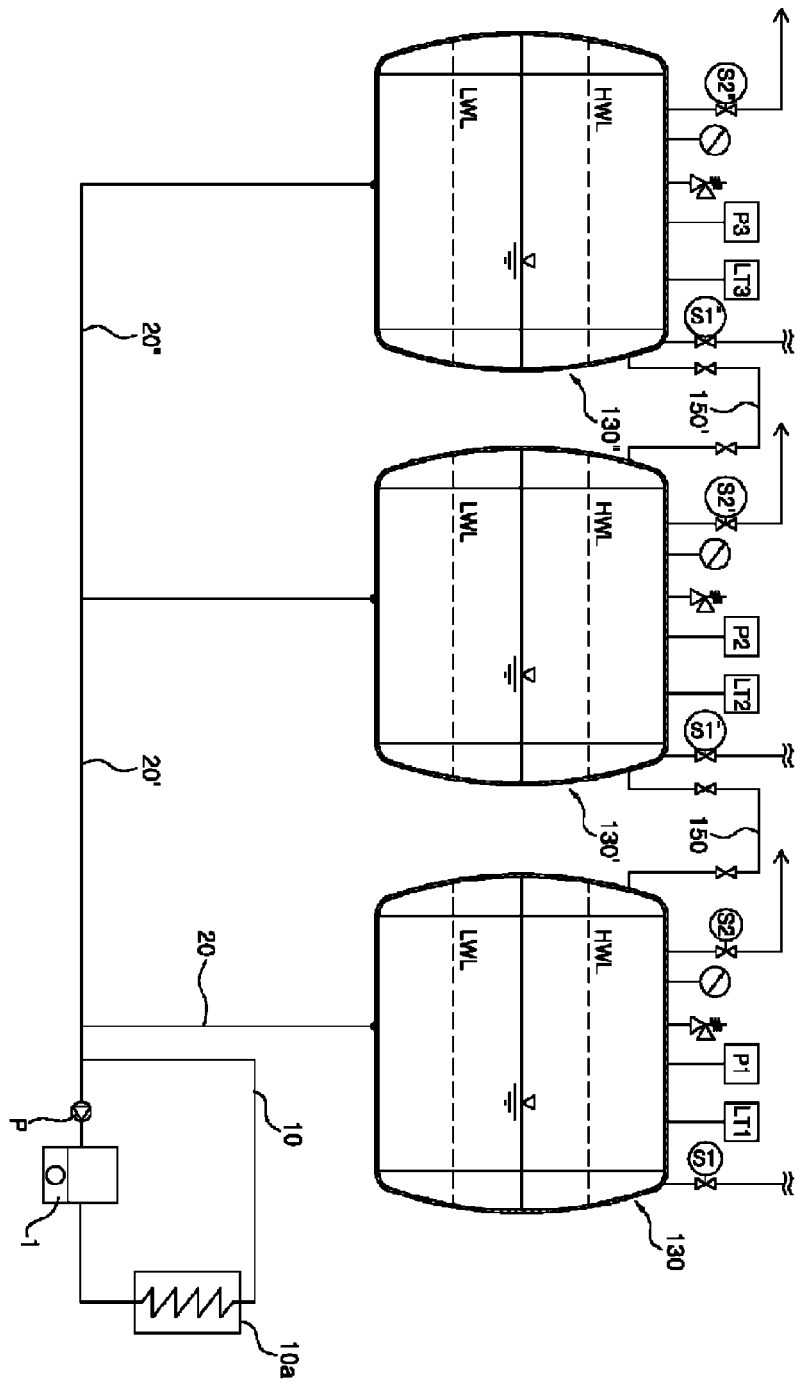
FIG. 5 is a view showing the construction of pressure maintenance equipment, according to a second embodiment of the present invention.

As shown in FIG. 5, a pressure maintenance equipment according to a second embodiment of the present invention further includes a third expansion tank 130 which is connected parallel to the first expansion tank 130 and the second expansion tank 130. The second expansion tank 130 and the third expansion tank 130 are connected to each other by an equalizing pipe 150. The third expansion tank 130 is also provided with a separate tank pressure sensor and tank-water-level sensor. In this embodiment, in lieu of the pipe pressure sensor that is used as a reference sensor in the first embodiment, the tank pressure sensor provided on the third expansion tank 130 can be used as the third pressure sensor P3. In this case, after determining whether an abnormality has occurred in any sensor by comparing the measurement deviation values to the preset deviation value, if all of the pressure sensors are determined to be normal, the mean of the measurement values of the pressure sensors P1, P2 and P3 is used to control the internal pressures of the expansion tanks; if one of the pressure sensors is determined to be abnormal, the mean of the measurement values of the other two pressures sensors, with the exception of the abnormal pressure sensor, is used to control the internal pressures of the expansion tanks; and if two or more pressure sensors are determined to be abnormal, an alarm is generated and, preferably, the system is checked after suspending operation thereof, or the mean or median of the three pressure sensors may be temporarily used.

That is, in the first embodiment, because a differential head between the third pressure sensor P3 and the first or second pressure sensors P1 or P2 causes a deviation in measurement values, the third pressure sensor P3 is used only as the reference sensor and is excluded when determining the reference control value. However, in the second embodiment, the third pressure sensor P3 is the tank pressure sensor that is provided on the third expansion tank 130. Because the third pressure sensor P3 outputs a measurement value in the same manner as that of the second pressure sensor P2 or the first pressure sensor P1, the third pressure sensor P3 is used as an actual sensor rather than merely as the reference sensor such that the measurement value of the third pressure sensor P3 is reflected when the reference control value is determined. The method of controlling the supply of nitrogen gas into the expansion tanks or the exhaust therefrom based on the determined reference control value is the same as that of the first embodiment, and as such detailed explanation will be omitted.

In this way, the pressure maintenance equipment provided with the multiple pressure sensors according to the present invention checks whether an abnormality has occurred in any pressure sensor and determines a reference control value with the exclusion of the measurement value of the pressure sensor that has been determined to be abnormal, thus making it possible to precisely and reliably control the pressure maintenance equipment.

Although the preferred embodiments of the present invention have been disclosed for illustrative purposes, it will be appreciated that the scope of the invention is not limited thereto, and any and all modifications, variations or equivalent arrangements which can be derived from the embodiment should be considered to be within the scope of the invention.

The invention claimed is:

1. A method of controlling pressure maintenance equipment for a cooling and heating system, the pressure maintenance equipment comprising: a first expansion tank and a second expansion tank provided branching off from a circulation piping system and connected parallel to the circulation piping system, the first expansion tank and second expansion tank being connected to each other by an equalizing pipe; a first pressure sensor and a second pressure sensor respectively and independently provided on the first expansion tank and the second expansion tank, each of the first and second pressure sensors measuring an internal pressure of the corresponding expansion tank; a third pressure sensor sensing a pipe pressure of the circulation piping system; a nitrogen supply unit supplying nitrogen gas into the expansion tanks; nitrogen gas supply valves provided to supply nitrogen gas from the nitrogen supply unit into the corresponding expansion tanks; and nitrogen gas exhaust valves provided to exhaust nitrogen gas from the corresponding expansion tanks, the method comprising:

measuring the internal pressure of the first expansion tank using the first pressure sensor;

measuring the internal pressure of the second expansion tank using the second pressure sensor;

measuring the pipe pressure of the circulation piping system using the third pressure sensor;

calculating absolute values of differences among measurement values of the internal pressures of the first and second expansions tanks and a measurement value of the pipe pressure of the circulation piping system, measured by the corresponding pressure sensors, and calculating measurement deviation values between the respective pressure sensors;

comparing the calculated measurement deviation values between the respective pressure sensors with a preset deviation value;

determining whether an abnormality has occurred in each of the pressure sensors based on the result of the comparison between the measurement deviation values and the preset deviation value;

excluding the measurement value of a pressure sensor that is determined to be abnormal and the measurement value of the third pressure sensor, and outputting the measurement value of the remaining pressure sensor or a mean of the measurement values of the remaining pressure sensors as a reference control value for the internal pressures of the expansion tanks; and comparing the output reference control value with a preset target reference value of the expansion tanks, and determining whether pipe water has expanded or contracted, and supplying nitrogen gas to the expansion tanks or exhausting nitrogen gas from the expansion tanks depending on a result of the determining whether the pipe water has expanded or contracted.

2. The method according to claim 1, wherein the preset deviation value is defined as a maximum value of a permissible deviation of each of the pressure sensors when all of the pressure sensors are normal.

3. The method according to claim 1, wherein when all of the measurement deviation values between the respective pressures sensors are equal to or less than the preset deviation value, all of the pressure sensors are determined to be normal, and a mean of measurement values of the first pressure sensor and the second pressure sensor is output as the reference control value;

when both a measurement deviation value between the first pressure sensor and the second pressure sensor and a measurement deviation value between the second pressure sensor and the third pressure sensor are greater than the preset deviation value, and a measurement deviation value between the third pressure sensor and the first pressure sensor is equal to or less than the preset deviation value, the second pressure sensor is determined to be abnormal, and the measurement value of the first pressure sensor is output as the reference control value;

when a measurement deviation value between the first pressure sensor and the second pressure sensor is equal to or less than the preset deviation value, and both a measurement deviation value between the second pressure sensor and the third pressure sensor and a measurement deviation value between the third pressure sensor and the first pressure sensor are greater than the preset deviation value, the third pressure sensor is determined to be abnormal, and a mean of the measurement values of the first pressure sensor and the second pressure sensor is output as the reference control value; and when both a measurement deviation value between the first pressure sensor and the second pressure sensor and a measurement deviation value between the third pressure sensor and the first pressure sensor are greater than the preset deviation value, and a measurement deviation value between the second pressure sensor and the third pressure sensor is equal to or less than the preset deviation value, the first pressure sensor is determined to be abnormal, and the measurement value of the second pressure sensor is output as the reference control value.

4. The method according to claim 3, wherein when all of measurement deviation values between the respective pressure sensors are greater than the preset deviation value, two or more pressure sensors are determined to be abnormal.

5. A method of controlling pressure maintenance equipment for a cooling and heating system, the pressure maintenance equipment comprising: a first expansion tank, a second expansion tank and a third expansion tank provided branching off from a circulation piping system and connected parallel to the circulation piping system, the first, second and third expansion tanks being connected to each other by equalizing pipes; a first pressure sensor, a second pressure sensor and a third pressure sensor respectively and independently provided on the first, second and third expansion tanks, each of the first, second and third pressure sensors measuring an internal pressure of the corresponding expansion tank; a nitrogen supply unit supplying nitrogen gas to the expansion tanks; nitrogen gas supply valves provided to supply nitrogen gas from the nitrogen supply unit to the corresponding expansion tanks; and nitrogen gas exhaust valves provided to exhaust nitrogen gas from the corresponding expansion tanks, the method comprising:

measuring the internal pressures of the expansion tanks using the corresponding pressure sensors;

calculating absolute values of differences between respective measurement values of the expansion tanks that are measured by the pressure sensors, and calculating measurement deviation values between the respective pressure sensors;

comparing the calculated measurement deviation values between the respective pressure sensors with a preset deviation value;

determining whether an abnormality has occurred in each of the pressure sensors based on a result of the comparison between the measurement deviation values and the preset deviation value;

excluding the measurement value of a pressure sensor that is determined to be abnormal, and outputting a mean of the measurement values of the remaining pressure sensors as a reference control value for the internal pressures of the expansion tanks; and comparing the output reference control value with a preset target reference value of the expansion tanks, and determining whether pipe water has expanded or contracted, and supplying nitrogen gas to the expansion tanks or exhausting nitrogen gas from the expansion tanks depending on a result of the determining whether the pipe water has expanded or contracted.

6. The method according to claim 5, wherein the preset deviation value is defined as a maximum value of a permissible deviation of each of the pressure sensors when all of the pressure sensors are normal.

7. The method according to claim 5, wherein when all of the measurement deviation values between the respective pressure sensors are equal to or less than the preset deviation value, all of the pressure sensors are determined to be normal, and a mean of measurement values of the first pressure sensor, the second pressure sensor and the third pressure sensor is output as the reference control value;

when both a measurement deviation value between the first pressure sensor and the second pressure sensor and a measurement deviation value between the second pressure sensor and the third pressure sensor are greater than the preset deviation value, and a measurement deviation value between the third pressure sensor and the first pressure sensor is equal to or less than the preset deviation value, the second pressure sensor is determined to be abnormal, and a mean of the measurement values of the first pressure sensor and the third pressure sensor is output as the reference control value;

when a measurement deviation value between the first pressure sensor and the second pressure sensor is equal to or less than the preset deviation value, and both a measurement deviation value between the second pressure sensor and the third pressure sensor and a measurement deviation value between the third pressure sensor and the first pressure sensor are greater than the preset deviation value, the third pressure sensor is determined to be abnormal, and a mean of the measurement values of the first pressure sensor and the second pressure sensor is output as the reference control value; and when both a measurement deviation value between the first pressure sensor and the second pressure sensor and a measurement deviation value between the third pressure sensor and the first pressure sensor are greater than the preset deviation value, and a measurement deviation value between the second pressure sensor and the third pressure sensor is equal to or less than the preset deviation value, the first pressure sensor is determined to be abnormal, and a mean of the measurement values of the second pressure sensor and the third pressure sensor is output as the reference control value.

8. The method according to claim 7, wherein when all measurement deviation values between the respective pressure sensors are greater than the preset deviation value, two or more pressure sensors are determined to be abnormal.

* * * * *